(12) United States Patent
Reed

(10) Patent No.: US 6,804,821 B1
(45) Date of Patent: Oct. 12, 2004

(54) TRAY COVER FOR VERTICALLY MOUNTED OPTICAL DISC DRIVES

(75) Inventor: Scott A. Reed, Rancho Santa Margarita, CA (US)

(73) Assignee: Gateway, Inc., Poway, CA (US)

( * ) Notice: Subject to any disclaimer, the term of this patent is extended or adjusted under 35 U.S.C. 154(b) by 24 days.

(21) Appl. No.: 10/127,891

(22) Filed: Apr. 23, 2002

(51) Int. Cl.$^7$ .............................................. G11B 33/02
(52) U.S. Cl. ...................................................... 720/622
(58) Field of Search .............................. 369/75.2, 75.1, 369/77.1, 77.2; 720/622, 619, 620

(56) References Cited

U.S. PATENT DOCUMENTS

| | | | |
|---|---|---|---|
| 5,528,566 A | * | 6/1996 | McGee et al. ........... 369/30.86 |
| 5,930,218 A | | 7/1999 | Mitsui et al. |
| 6,046,975 A | | 4/2000 | Seo |
| 6,052,352 A | | 4/2000 | Liou |
| 6,137,761 A | | 10/2000 | Oh et al. |
| 6,167,015 A | | 12/2000 | Jeong |
| 6,198,712 B1 | | 3/2001 | Okamoto |
| 6,219,324 B1 | | 4/2001 | Sato et al. |
| 6,229,781 B1 | | 5/2001 | Fujisawa |
| 6,243,356 B1 | | 6/2001 | Rubino, III |
| 6,256,278 B1 | | 7/2001 | Furukawa et al. |
| 6,259,667 B1 | | 7/2001 | Huang et al. |
| 6,295,265 B1 | * | 9/2001 | Cundiff, Sr. ............... 369/75.2 |
| 6,560,184 B2 | * | 5/2003 | Shida et al. ............... 369/75.2 |

FOREIGN PATENT DOCUMENTS

JP                06251479 A1   *   3/1995

OTHER PUBLICATIONS

48X CD-Rom Enhanced IDE Drive; printed Jul. 11, 2001.

* cited by examiner

Primary Examiner—George J. Letscher
(74) Attorney, Agent, or Firm—Scott Charles Richardson; Kevin E. West; Suiter-West

(57) ABSTRACT

A tray cover for retaining optical discs within an optical disc drive capable of being vertically oriented is comprised of a cover attachable to the tray of the optical disc drive. The cover forms a pocket against the tray for receiving the optical disc so that the optical disc is generally retained against the tray as the tray is extended and retracted.

19 Claims, 4 Drawing Sheets

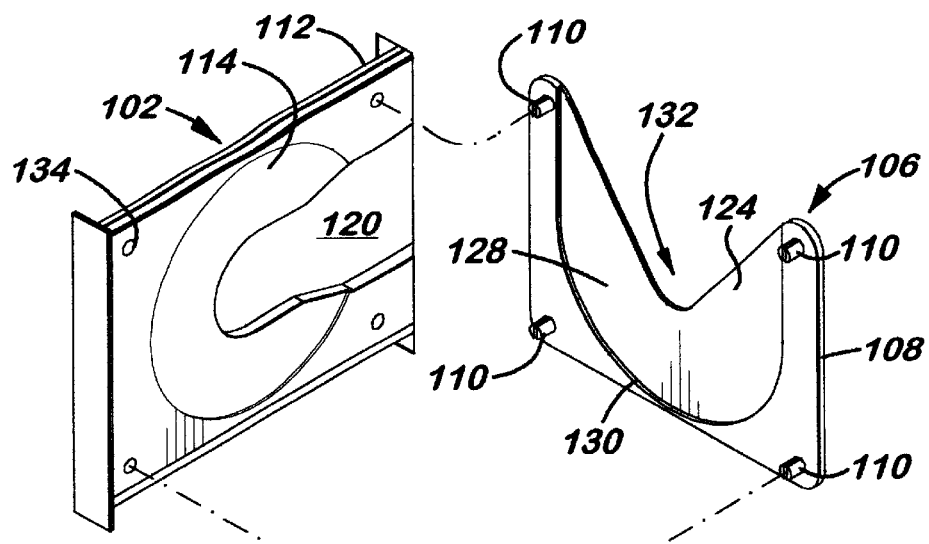
FIG. 2
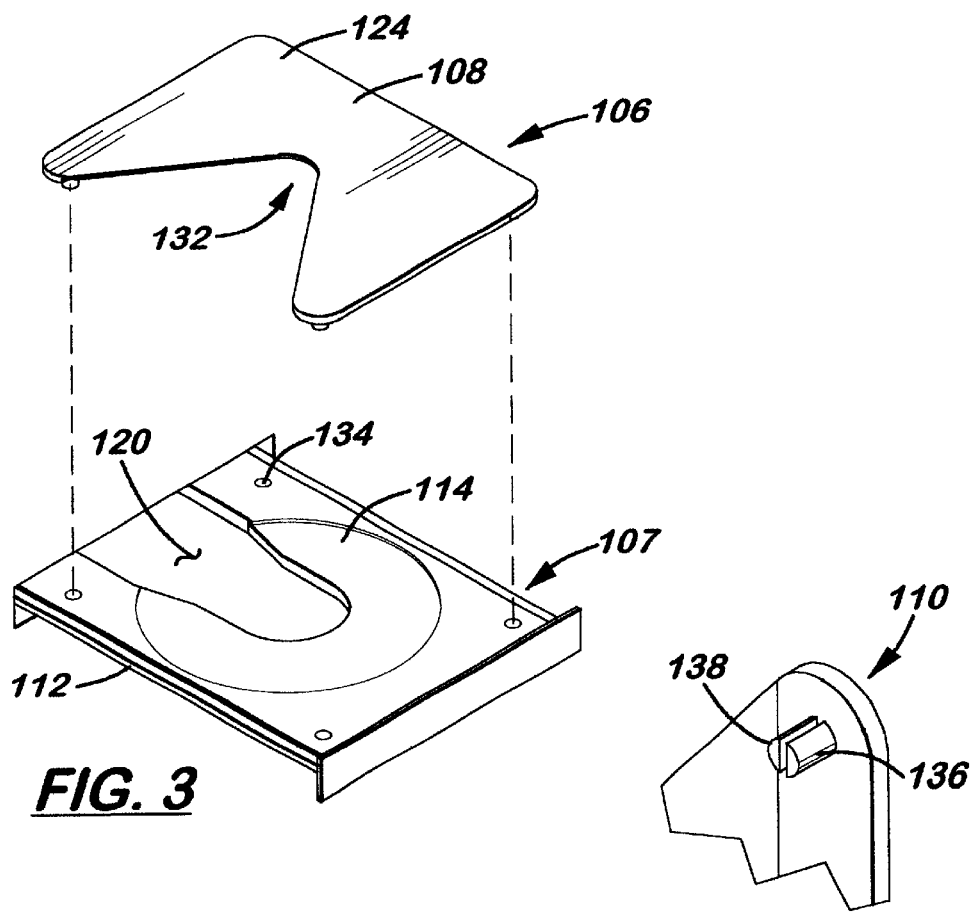
FIG. 3
FIG. 4

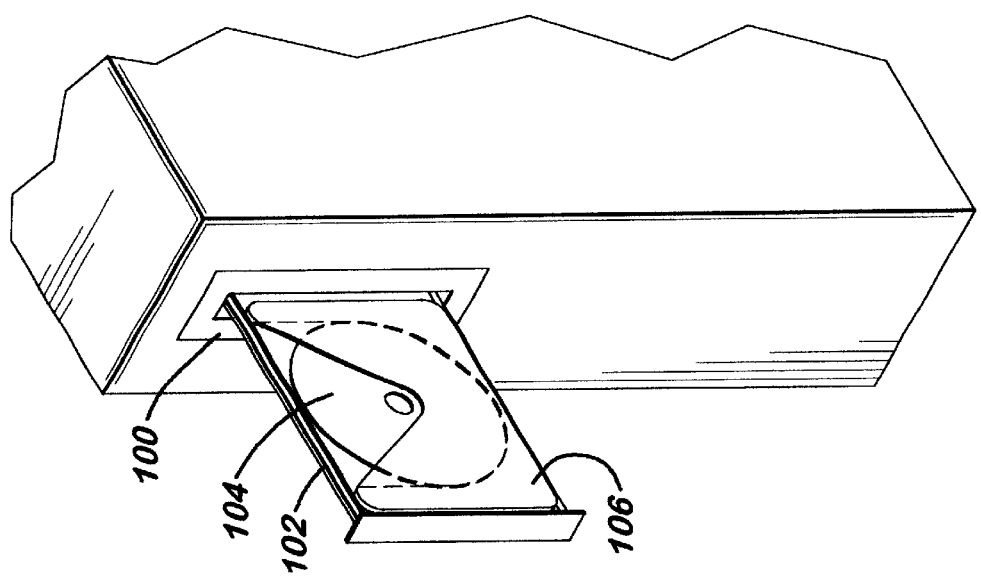
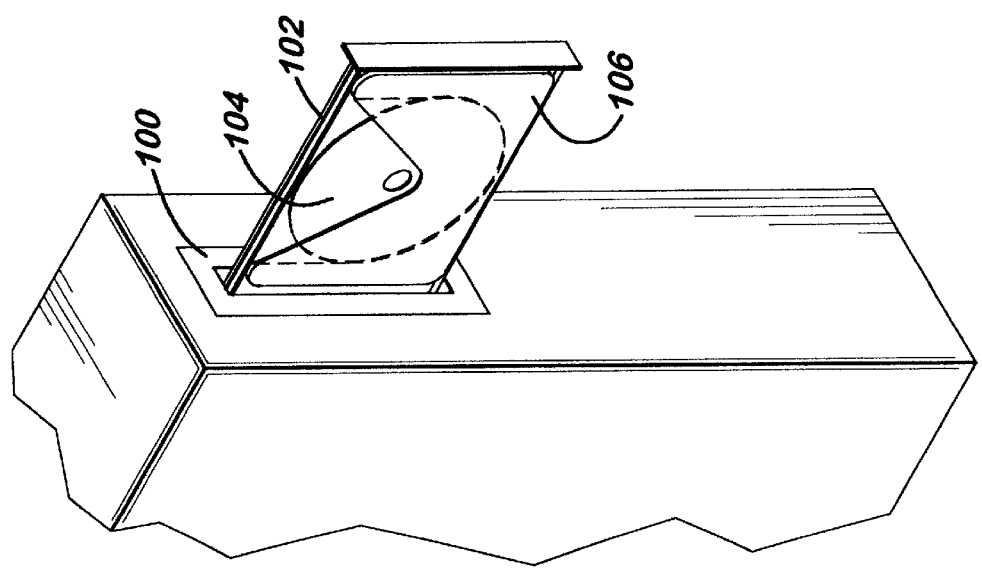

TRAY COVER FOR VERTICALLY MOUNTED OPTICAL DISC DRIVES

FIELD OF THE INVENTION

The present invention generally relates to the field optical disc drives, and particularly to a tray cover for retaining optical discs within an optical disc drive capable of being vertically mounted within an electronic device such as a personal computer, server, or the like.

BACKGROUND OF THE INVENTION

Optical disc drives typically employ a disc tray that is extendable from the drive for receiving an optical disc such as a CD, CD-ROM, DVD, or the like. This extendable tray normally includes a shallow recess or cavity formed in its upper surface in which the optical disc is placed so that the disc is properly positioned during retraction of the tray into the drive.

Such optical disc drives work well when mounted in a horizontal orientation. However, in some applications it is necessary to mount the drives in a vertical orientation. For such applications, the tray of the optical disc drive is typically provided with a plurality of small retention clips spaced about the shallow recess or cavity in which the optical disc is placed. These retention clips are rotated over an optical disc placed in the recess to retain the disc in the recess so that the tray may be closed. This operation requires that the user use both hands to load the optical disc into the tray. The user must hold the optical disc in place within the recess with one hand while rotating the retention clips to hold the disc in place. Many users find this process inconvenient, and time consuming. Moreover, users often may fail to completely rotate all retention clips to their closed position, allowing the optical disc to fall out of the tray as it is retracted or when the tray is again opened to remove the disc, possibly jamming the drive and damaging the disc.

Known to the art are mechanisms that clamp the optical disc to the tray as the tray is retracted into the drive. However, such mechanisms are typically complex employing many moving parts (e.g., springs, hinges, gear trains, etc.), and are thus costly to manufacture. Consequently, these devices have failed to supplant the simpler retention clip retention schemes in most optical disc drive designs.

SUMMARY OF THE INVENTION

The present invention is directed to a tray cover for retaining optical discs within an optical disc drive capable of being vertically oriented (e.g., being mounted in a vertical orientation within an electronic device such as a personal computer, server, or the like). In exemplary embodiments, the tray cover is comprised of a cover attachable to the tray of the optical disc drive. The cover forms a pocket against the tray for receiving the optical disc so that the optical disc is generally retained against the tray as the tray is extended and retracted.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2 is an exploded isometric view of the optical disc drive shown in FIG. 1, further illustrating attachment of the tray cover to the tray of the disc drive;

FIG. 3 is a side elevational view further illustrating fasteners for attaching the tray cover to the tray;

FIG. 4 is an isometric view of a broken away portion of the tray cover showing detail of a fastener on the cover;

FIGS. 7 and 8 illustrate attachment of the tray cover to the tray regardless of the orientation of the disc drive.

DETAILED DESCRIPTION OF THE INVENTION

Reference will now be made in detail to the presently preferred embodiments of the invention, examples of which are illustrated in the accompanying drawings.

Figure 1:
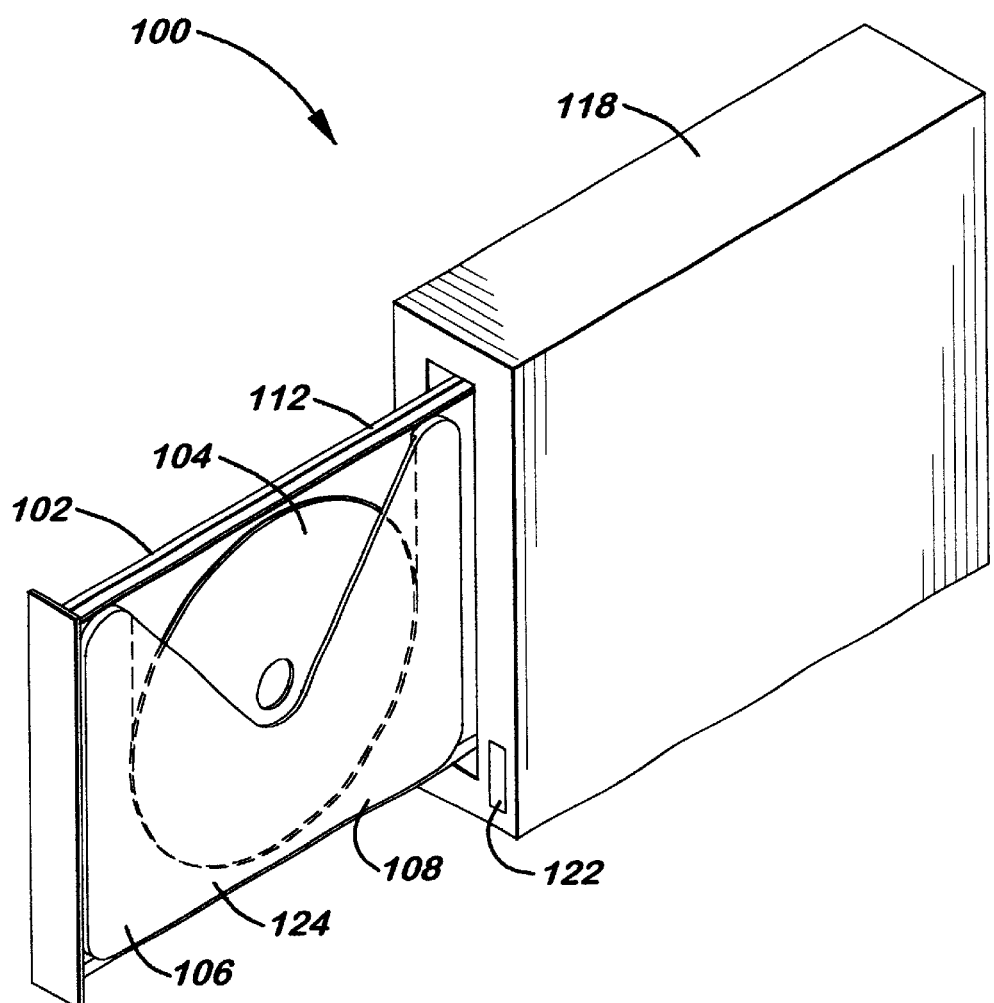
FIG. 1 is an isometric view illustrating an optical disc drive having a tray cover in accordance with an exemplary embodiment of the present invention.

Referring generally now to FIGS. 1 through 3, an optical disc drive having a tray cover in accordance with an exemplary embodiment of the present invention is described. The optical disc drive 100 is suitable for use in reading information from and/or writing information to optical discs having formats such as Compact Disc (CD), Compact Disc-Read Only Memory (CD-ROM), Readable/Writeable Compact Discs (CD-R, CD-RW), or Digital Versatile Disc (DVD, DVD-ROM, DVD-R, DVD-RW, DVD-RAM), laserdisc, minidisc, or the like. The optical disc drive 100 includes an extendable media transport tray 102 onto which a user may place an optical disc 104 for insertion into the drive 100. The media transport tray 102 moves between a closed position and an extended or opened position wherein an optical disc 104 may be inserted into or removed from the tray 102.

A tray cover 106 is attached to the disc transport tray 102 when the optical disc drive 100 is operated in a vertical orientation, as shown in FIGS. 1 and 2. In exemplary embodiments, the tray cover 106 is comprised of a thin cover 108 attached to the surface of the disc transport tray 102 in which the optical disc 106 is received by a suitable fastening apparatus (e.g., fasteners 110). As shown in FIG. 1, the cover 106 forms a thin pocket against the surface of the disc transport tray 102 that is open at one end for receiving the optical disc 104 so that the disc 104 is generally retained against the disc transport tray 102 as the tray 102 is extended and retracted. Where the optical disc drive 100 is operated in a horizontal orientation, the tray cover may be removed so that optical disc 104 may be inserted into and removed from disc transport tray 102 in a conventional manner as shown in FIG. 3.

In exemplary embodiments, the disc transport tray 102 may include a flattened, rectangular frame 112 having a shallow, generally circular recess or cavity 114 sized to receive the optical disc 104. For example, wherein the optical disc drive 100 is designed for use with a standard 12 cm optical disc 104 such as a Compact Disc (CD), digital versatile disc (DVD), or the like, recess 114 may have a diameter slightly greater than 12 cm allowing the disc to rest within the recess 114 for transport into the drive 100. Preferably, when in the opened position, the recess 114 within the disc transport tray 102 is moved completely clear of the housing 118 of the optical disc drive 100 so that the optical disc 104 may be easily removed and replaced by a user. An opening 120 may be provided within the recess 108. When the disc transport tray 102 is retracted, this opening allows a drive mechanism (not shown) to engage and spin the optical disc 104 so that information may be transferred between the disc 104 and the drive 100. The drive mechanism may also move the disc transport tray 102 between the fully closed position and the fully opened position. A user may extend the disc transport tray 102 by depressing a control button 122 or like control whereupon the disc transport tray 102 is extended by the drive mechanism. Alternatively, wherein the optical disc drive is part of a computer system (see FIGS. 6 and 7), the user may select an icon on the display screen of the computer. The computer may then command the optical disc drive 100 to open the disc transport tray 102.

In the embodiment shown in FIGS. 1 through 3, tray cover 106 is comprised of a cover 124 attachable to disc transport tray 102 over recess 114 by fasteners 110. Preferably, cover 124 is comprised of a thin, flattened panel formed of plastic, metal, or the like. A shallow recess 128 is formed on the surface of the panel abutting the disc transport tray 102. As shown in FIG. 2, recess 128 includes a generally circular bottom portion 130 corresponding in size and shape to recess 114 formed in disc transport tray 102. When attached to the tray 102, recess 128 cooperates with the recess 114 in the surface of tray 102 to form a thin pocket or pouch in which optical disc 104 may be placed when the optical disc drive is placed in a vertical orientation (see FIG. 1). An opening 132 may be formed at the top of recess 128 through which the optical disc 104 may be grasped for removal from the disc transport tray 102. In exemplary embodiments, a second opening, aligned with the first opening 132 may be provided in the disc transport tray 102 for allowing the optical disc 104 to be grasped. Additionally, in exemplary embodiments, the upper edge of the cover 106 may be generally V-shaped, extending from the upper edge of the disc transport tray 102 and above the center hole of the optical disc, at its outer corners, to below the center hole of an optical disk placed in the disc transport tray 102 at its center.

Tray cover 106 further includes a plurality of fasteners 110 for attaching the cover 108 to the tray 102. In one embodiment, shown in FIG. 4, fasteners 110 may comprise posts 110 that engage corresponding holes 134 (see FIGS. 2 and 3) formed in the surface of disc transport tray 102 about recess 114. In the embodiment shown, posts 110 are split along their centerline to form a first post half 138 and a second post half 136 which flex to allow posts 110 to be inserted into and removed holes 134 when the tray cover 106 is attached to or removed from the disc transport tray 102. Once inserted into holes 134 friction between the post halves 138 & 136 and the faces of holes 134 retain the posts 110 within the holes 134.

Figure 5:
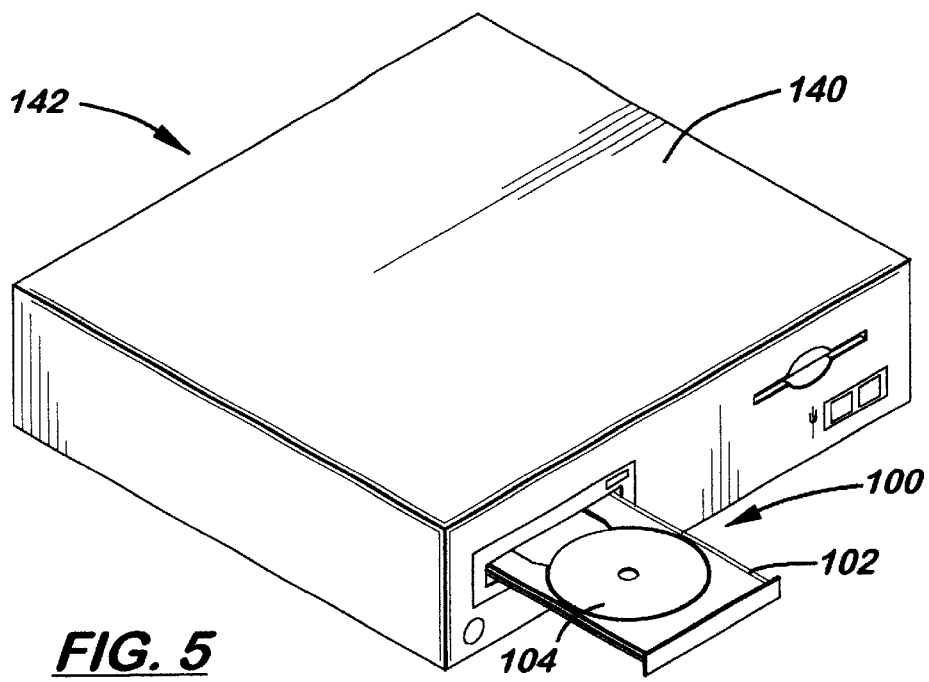
FIGS. 5 and 6 illustrate a computer system employing the optical disc drive depicted in FIG. 1.
Figure 6:
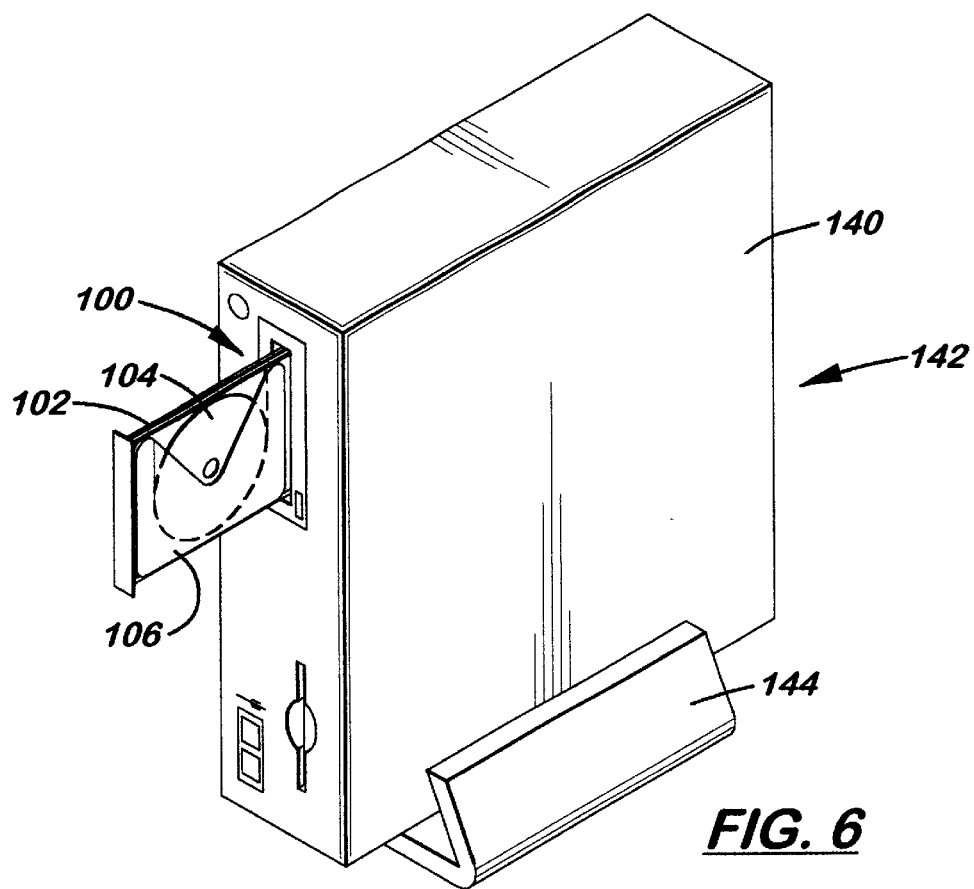

In exemplary embodiments, optical disc drive 100 may be installed in the chassis 140 of a computer system 142 capable of being oriented horizontally (i.e., in a desktop orientation) as shown in FIG. 5, or vertically (i.e., in a mini-tower orientation) as shown in FIG. 6, where the chassis may be supported in a stand 144, or the like. As shown, when the chassis is used in the horizontal or desktop orientation, optical disk drive is also operated in a horizontal orientation. Thus, tray cover 106 may be removed so that optical disc 104 may be inserted into and removed from disc transport tray 102 in a conventional manner. However, when chassis 140 is placed in the vertical or mini-tower orientation, optical disc drive 100 is also oriented in a vertical orientation. Accordingly, tray cover 106 is attached to disc transport tray 102. The tray cover 106 forming a thin pocket against the surface of the tray 102 that is open at one end for receiving the optical disc 104 so that the disc 104 is generally retained against the disc transport tray 102 as the tray 102 is extended and retracted.

In exemplary embodiments, fasteners 110 are arranged so that tray cover 106 may be attached to the disc transport tray 102 with opening 132 facing either to the right or left of the tray 102. In this manner, optical disc drive 100 may be oriented so that recess 114 faces either to the left, as shown in FIG. 7, or to the right, as shown in FIG. 8. For instance, in the exemplary embodiment shown in FIGS. 2 and 3, fasteners 110 are arranged to engage holes arranged in an equally spaced pattern about recess 114. Thus, cover 124 may be attached to the tray 102 with opening 132 facing either to the right or left of the tray 102 depending on the orientation of optical disc drive 100.

It is believed that the tray cover for vertically mounted optical disc drives of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A tray cover for retaining an optical disc having a center hole within a tray of an optical disc drive capable of operating in a vertical orientation, comprising:

a cover; and a fastener for fastening the cover to the tray, wherein the cover extends above the center hole of the optical disc on both sides of the center hole while the tray slides between a first position extended from the optical disc drive and a second position retracted within the optical disc drive to form a pocket against the tray for receiving the optical disc so that the optical disc is generally retained against the tray as the tray is extended and retracted.

2. The tray cover as claimed in claim 1, wherein the cover includes an opening through which the optical disc is grasped for insertion and removal from the tray.

3. The tray cover as claimed in claim 1, wherein the fastener facilitates attachment and removal of the cover, and wherein the cover is attached to the tray when the optical disc drive is in the vertical orientation.

4. The tray cover as claimed in claim 1, wherein the fastener comprises a projection suitable for being inserted into a corresponding hole formed in the tray, the projection expanding against the sides of the hole for retaining the cover to the tray.

5. The tray cover as claimed in claim 1, wherein the cover includes an upper edge, the upper edge being generally V-shaped and extending from an upper edge of the tray to below the center hole of an optical disk placed in the tray.

6. An optical disc drive capable of operating in a vertical orientation, comprising:

a housing;

a tray extendable from the housing for receiving an optical disc having a center hole;

a cover attachable to the tray, wherein the cover extends above the center hole of the optical disc on both sides of the center hole while the tray slides between a first position extended from the optical disc drive and a second position retracted within the optical disc drive to form a pocket against the tray for receiving the optical disc so that the optical disc is generally retained against the tray as the tray is extended and retracted from the housing.

7. The optical disc drive as claimed in claim 6, further comprising a fastener for fastening the cover to the tray.

8. The optical disc drive as claimed in claim 7, wherein the fastener facilitates attachment and removal of the cover, and wherein the cover is attached to the tray when the optical disc drive is in the vertical orientation.

9. The optical disc drive as claimed in claim 6, wherein the cover includes an opening through which the optical disc is grasped for insertion and removal from the tray.

10. The optical disc drive as claimed in claim 9, wherein the tray includes a second opening aligned with the first opening for allowing the optical disc to be grasped.

11. The optical disc drive as claimed in claim 6, wherein the fastener comprises a projection suitable for being inserted into a corresponding hole formed in the tray, the projection expanding against the sides of the hole for retaining the cover to the tray.

12. The optical disc drive as claimed in claim 6, wherein the cover includes an upper edge, the upper edge being generally V-shaped and extending from an upper edge of the tray to below the center hole of an optical disk placed in the tray.

13. A computer system, comprising:
    a chassis capable of operating in both a horizontal orientation and vertical orientation;
    an optical disc drive disposed in the chassis, the optical disc drive further comprising:
    a housing; and
    a tray extendable from the housing for receiving an optical disc having a center hole;
    a cover attachable to the tray,
    wherein the cover extends above the center hole of the optical disc on both sides of the center hole while the tray slides between a first position extended from the optical disc drive and a second position retracted within the optical disc drive to form a pocket against the tray for receiving the optical disc so that the optical disc is generally retained against the tray as the tray is extended and retracted from the housing when the chassis is operating in the vertical orientation.

14. The computer system as claimed in claim 13, further comprising a fastener for fastening the cover to the tray.

15. The computer system as claimed in claim 14, wherein the fastener facilitates attachment and removal of the cover, and wherein the cover is attached to the tray when the optical disc drive is in the vertical orientation.

16. The computer system as claimed in claim 13, wherein the cover includes an opening through which the optical disc is grasped for insertion and removal from the tray.

17. The computer system as claimed in claim 16, wherein the tray includes a second opening aligned with the first opening for allowing the optical disc to be grasped.

18. The computer system as claimed in claim 13, wherein the fastener comprises a projection suitable for being inserted into a corresponding hole formed in the tray, the projection expanding against the sides of the hole for retaining the cover to the tray.

19. The computer system as claimed in claim 13, wherein the cover includes an upper edge, the upper edge being generally V-shaped and extending from an upper edge of the tray to below the center hole of an optical disk placed in the tray.

* * * * *